United States Patent
Picot

(10) Patent No.: US 9,809,296 B2
(45) Date of Patent: Nov. 7, 2017

(54) AIRCRAFT FUSELAGE COMPRISING AN OUTER INSULATION

(71) Applicant: Airbus Operations (SAS), Toulouse (FR)

(72) Inventor: Olivier Picot, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 596 days.

(21) Appl. No.: 14/514,634

(22) Filed: Oct. 15, 2014

(65) Prior Publication Data

US 2015/0108272 A1    Apr. 23, 2015

(30) Foreign Application Priority Data

Oct. 17, 2013  (FR) ..................................... 13 60097

(51) Int. Cl.
| | |
|---|---|
| *B64C 1/40* | (2006.01) |
| *B64C 1/00* | (2006.01) |
| *B64C 1/38* | (2006.01) |
| *B64C 1/12* | (2006.01) |

(52) U.S. Cl.
CPC .............. *B64C 1/40* (2013.01); *B64C 1/0009* (2013.01); *B64C 1/12* (2013.01); *B64C 1/38* (2013.01); *B64C 1/403* (2013.01)

(58) Field of Classification Search
CPC combination set(s) only.
See application file for complete search history.

(56) References Cited

U.S. PATENT DOCUMENTS

| | | | |
|---|---|---|---|
| 3,152,548 A | 10/1964 | Schwartz | |
| 4,906,155 A * | 3/1990 | Balza | B64C 1/066 24/297 |
| 5,014,934 A * | 5/1991 | McClaflin | B64C 1/12 244/129.4 |
| 5,779,193 A | 7/1998 | Sloan | |
| 7,584,582 B1 * | 9/2009 | Hutter, III | B64C 1/40 156/91 |
| 2006/0248853 A1 * | 11/2006 | Bartley-Cho | F16B 5/01 52/782.1 |
| 2006/0248854 A1 * | 11/2006 | Bartley-Cho | B32B 3/12 52/782.1 |
| 2009/0090812 A1 * | 4/2009 | Boock | B64C 1/403 244/1 N |
| 2010/0170994 A1 * | 7/2010 | Burns | B64C 1/12 244/130 |

(Continued)

FOREIGN PATENT DOCUMENTS

EP     2409914     1/2012

OTHER PUBLICATIONS

French Search Report, Jul. 15, 2014.

*Primary Examiner* — Christopher P Ellis
(74) *Attorney, Agent, or Firm* — Greer, Burns & Crain Ltd.

(57) ABSTRACT

An aircraft fuselage comprising a structure, a skin connected to the structure and forming a barrier between the interior and the exterior of the fuselage, an external coating being plated or placed against said skin, wherein the external coating comprises a thermal insulator that covers the fuselage at least in part and has at least one foam insulating layer. The external coating comprises a plurality of juxtaposed panels adhesively bonded to the fuselage and/or secured to the fuselage by mechanical fixings.

11 Claims, 3 Drawing Sheets

(56) References Cited

U.S. PATENT DOCUMENTS

| | | | | |
|---|---|---|---|---|
| 2010/0320323 A1* | 12/2010 | Mueller | ................... | B64C 1/40 |
| | | | | 244/129.1 |
| 2012/0305706 A1* | 12/2012 | Weston | ................... | B64C 1/40 |
| | | | | 244/119 |
| 2013/0020434 A1* | 1/2013 | Muller | ..................... | B64C 1/40 |
| | | | | 244/1 N |
| 2013/0082144 A1 | 4/2013 | Lang et al. | | |
| 2013/0240668 A1* | 9/2013 | Holm | ..................... | B64C 1/067 |
| | | | | 244/1 N |
| 2013/0299630 A1* | 11/2013 | Redecker | ............... | B64C 1/067 |
| | | | | 244/1 N |

* cited by examiner

AIRCRAFT FUSELAGE COMPRISING AN OUTER INSULATION

CROSS-REFERENCES TO RELATED APPLICATIONS

This application claims the benefit of French patent application No. 1360097 filed on Oct. 17, 2013, the entire disclosures of which are incorporated herein by way of reference.

BACKGROUND OF THE INVENTION

The present invention relates to an aircraft fuselage comprising an outer insulation.

FIG. 1 schematically shows part of the fuselage 10 of an aircraft.

The fuselage 10 comprises a skin 12, which forms a barrier between the interior I and the exterior E of the fuselage. This skin 12 comprises an outer surface 14 in contact with the exterior E and an inner surface 16 in contact with the interior I. An outer coating in the form of at least one film of paint is applied to the outer surface of the skin in order to protect said skin against corrosion, to beautify said skin and to improve the aerodynamic characteristics of the aircraft.

During the flight phase, an air-conditioning system makes it possible to maintain the temperature in the interior I of the fuselage around 20° C., whereas the temperature at the exterior E of the fuselage is around −50° C.

In order to limit losses and to ensure passenger comfort, at least one insulation blanket 18 is provided, in the interior I of the fuselage, in the vicinity of the inner surface 16 of the skin of the fuselage.

Once this insulation blanket 18 has been placed in position, a space remains between said insulation blanket 18 and the skin 12, and the hot and humid air coming from the interior I of the fuselage circulates in said space.

During the flight, the inner surface 16 of the skin is at a temperature below 0° C., such that the humidity coming from the interior I of the fuselage tends to condense and to freeze at said inner surface 16. This phenomenon contributes to drying out the air in the interior I of the fuselage and causes discomfort for the passengers.

During the phase of descent, the temperature of the air outside the aircraft becomes increasingly warmer, such that the ice formed on the inner surface 16 tends to melt and to trickle onto the insulation blanket 18 until it reaches the lower part of the fuselage, where the condensates are collected and then discharged.

Consequently, in addition to the insulating function thereof, the insulation blanket 18 serves to seal the interior I of the fuselage and to drain the condensates so as to prevent these from trickling into the interior I of the fuselage, in particular onto sensitive systems, such as electrical circuits.

In order to ensure these two functions, an insulation blanket 18 in accordance with one embodiment is formed by a layer of thermally insulating material, such as glass wool, encased in a tight film made of plastics material.

In addition to the skin 12, the fuselage comprises a structure 20 that supports the skin 12 and that comprises numerous elements 22 extending toward the interior I of the fuselage by passing through the insulation blanket 18. Each traversing element 22 constitutes a thermal bridge and requires the design of complex forms of the insulation blanket 18 and/or alters the insulation performances.

In accordance with another aspect, the insulation blankets 18 are installed immediately after the structural assembly of the aircraft, such that they can withstand degradations during the installation of other systems and equipment of the aircraft. The replacement of damaged insulation blankets 18 requires the disassembly of a number of parts, which may be fragile, such as pipework.

Lastly, the insulation blankets 18 must be made of specific materials that meet the requirements of the FST (fire smoke toxicity) standards relating to toxic fumes in the case of fire.

The present invention also aims to overcome the disadvantages of the prior art.

SUMMARY OF THE INVENTION

To this end, the invention relates to an aircraft fuselage comprising a structure, a skin connected to said structure, said skin forming a barrier between the interior and the exterior of the fuselage, an external coating being plated or placed against said skin, characterized in that said external coating comprises a thermal insulation that covers the fuselage at least in part and that has at least one foam insulating layer, the external coating comprising a plurality of juxtaposed panels, adhesively bonded to the fuselage and/or secured to the fuselage by mechanical fixings.

This solution makes it possible:

to improve the passenger comfort by reducing the air drying phenomenon, to reduce the operating costs thanks to improved thermal insulation and improved aerodynamics, and to reduce the industrial costs by simplifying the fabrication of the insulating blanket and installation thereof on the fuselage.

The thermal insulation advantageously has a conductivity less than or equal to 0.5 W/m·K.

In accordance with a further feature of the invention, the external coating comprises an external layer connected to the insulating layer(s), in contact with airflows flowing outside the fuselage, said external layer comprising a smooth or structured external surface. The external layer is advantageously made of a shape-memory material.

The external coating advantageously comprises voids intended to accommodate, during use, any areas of roughness of the skin of the fuselage.

In accordance with a further feature of the invention, the external coating comprises a reinforcing framework in order to reinforce said coating.

The panels are preferably abutted so as to provide the fuselage with aerodynamic characteristics, two abutted panels having edges with complementary shapes so as to obtain a covering from front to rear of panels so as to avoid delamination and to promote the flow of airflows outside the fuselage.

The external coating advantageously comprises mechanical fixings in order to secure the panels to the fuselage, said mechanical fixings being arranged in the vicinity of the rear edge of the panels.

Each panel preferably comprises a metal framework, which extends outside the panel in the form of a flexible strip in order to ensure the electrical continuity between two adjacent panels.

The invention also relates to an aircraft comprising a fuselage with an outer insulation.

BRIEF DESCRIPTION OF THE DRAWINGS

Further features and advantages will become clear from the following description of the invention, given merely by way of example, with reference to the accompanying drawings, in which.

DETAILED DESCRIPTION OF THE PREFERRED EMBODIMENTS

Figure 1:
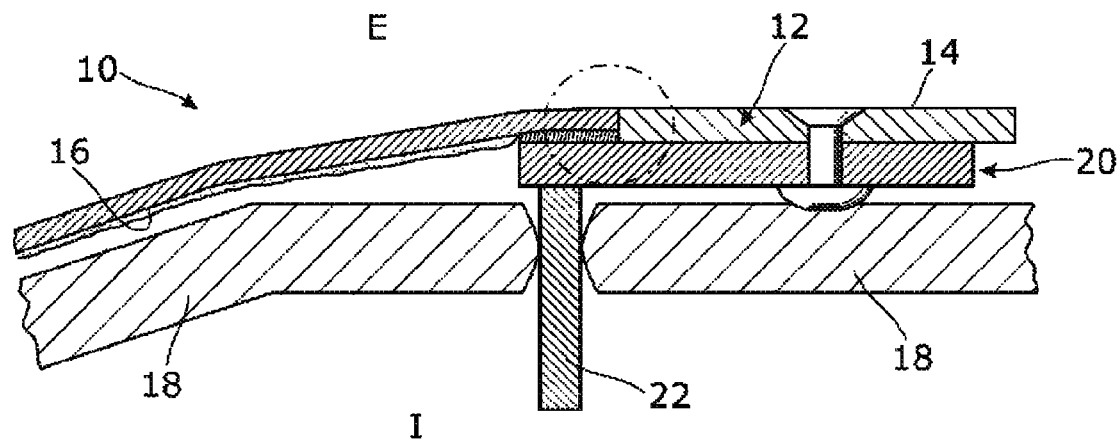
FIG. 1 is a sectional view of part of the fuselage of an aircraft illustrating the prior art.
Figure 2:
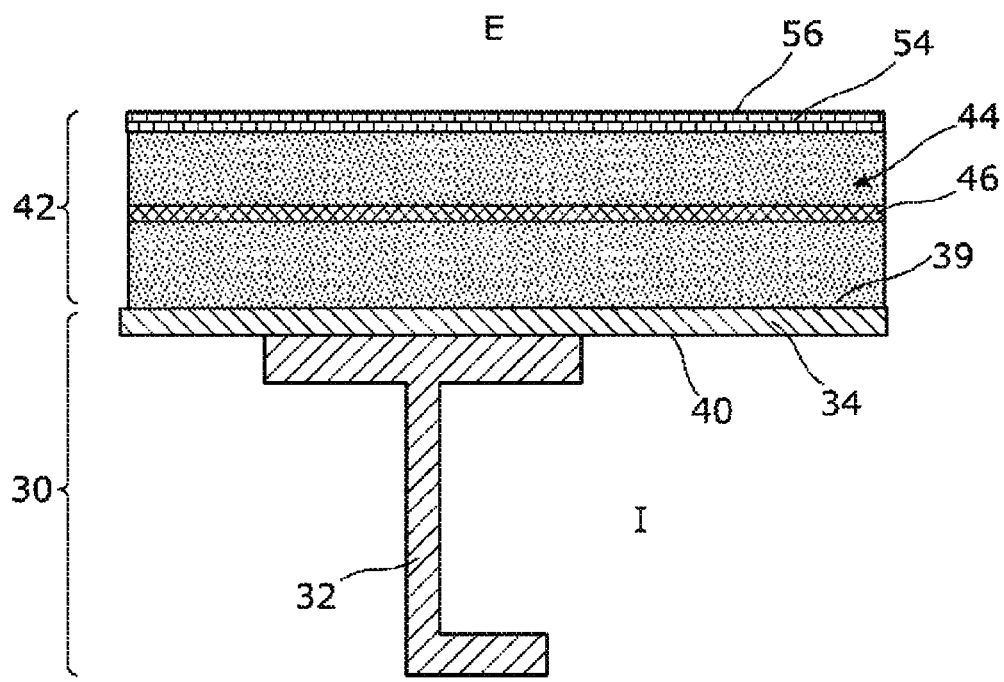
FIG. 2 is a sectional view of part of the fuselage of an aircraft illustrating the invention.
Figure 3:
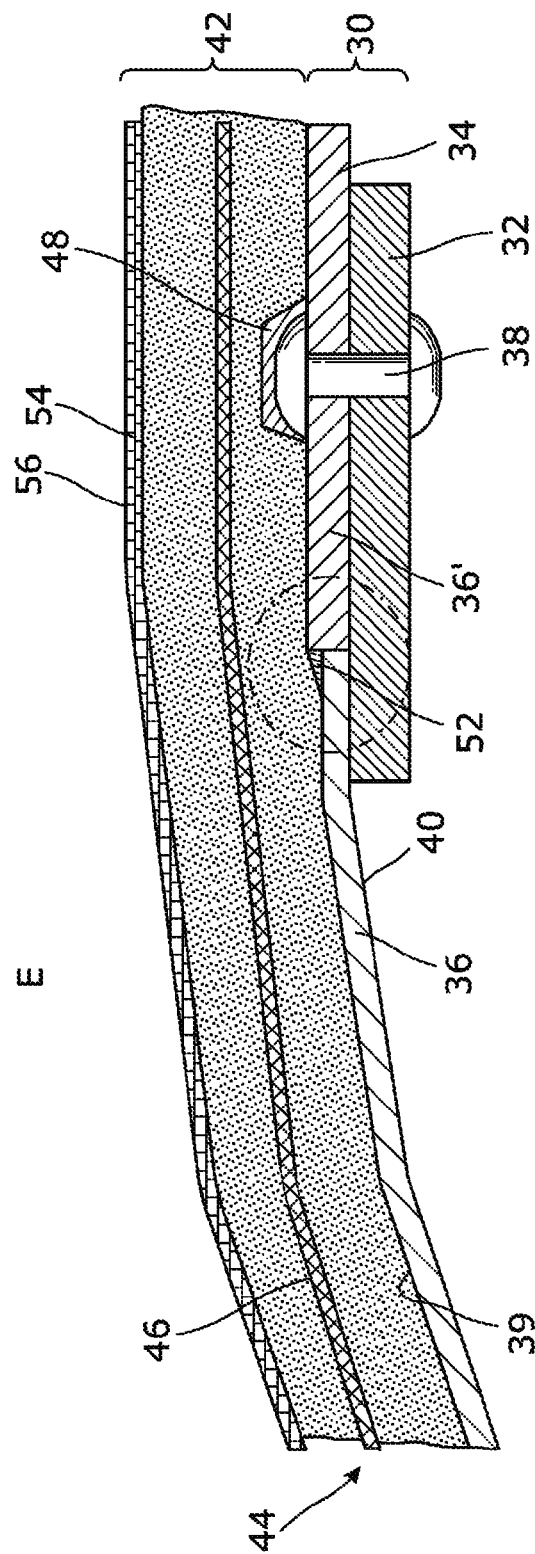
FIG. 3 is a sectional view of part of the fuselage of an aircraft illustrating certain features of the invention.
Figure 4:
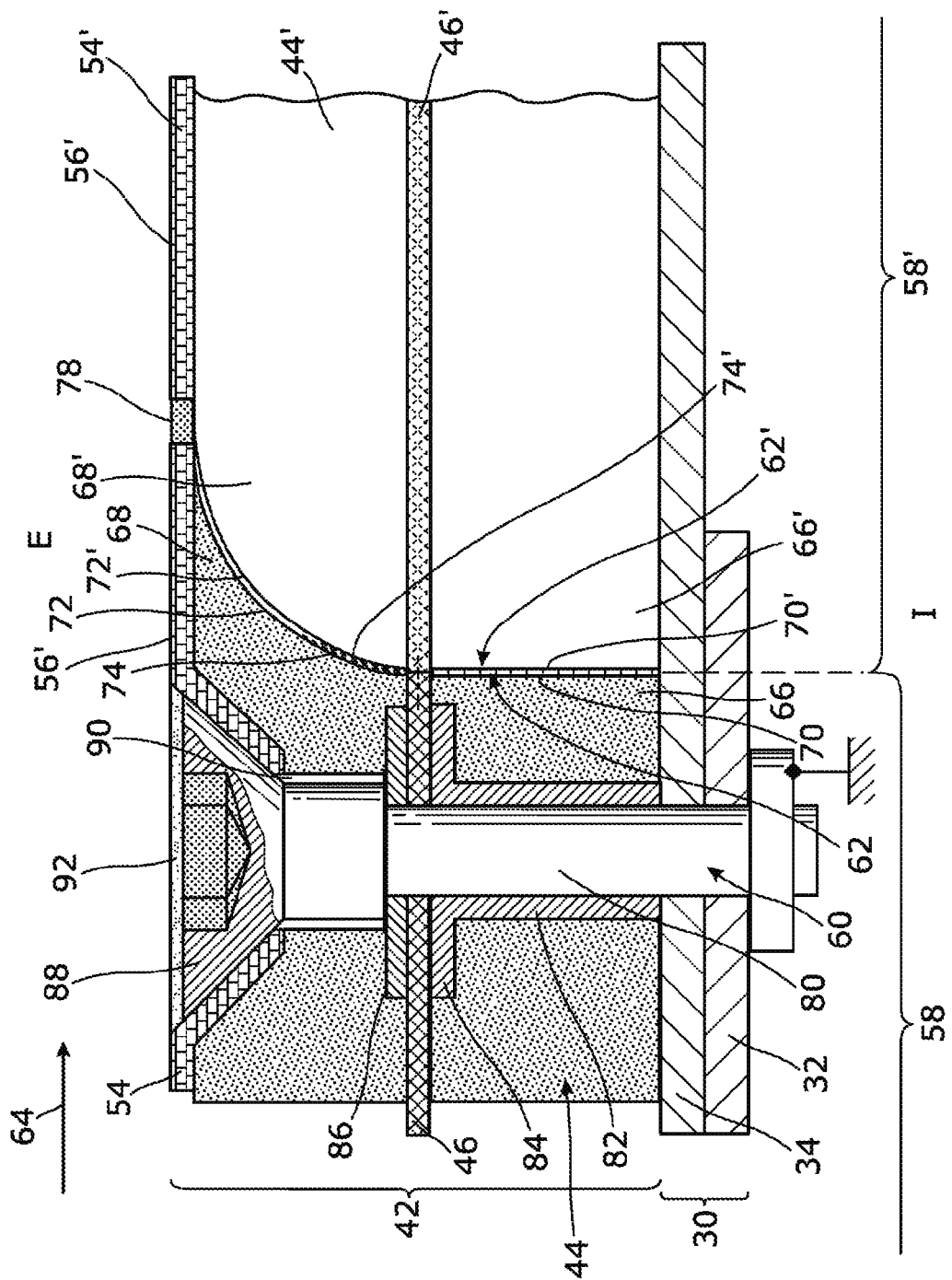
FIG. 4 is a sectional view of part of the fuselage of an aircraft illustrating an embodiment of the invention.

Part of a fuselage 30 of an aircraft has been shown in FIGS. 2 to 4. For the present application, the term "fuselage" means the fuselage of an aircraft, a portion of the fuselage of an aircraft or part of the fuselage of an aircraft.

In accordance with an embodiment illustrated in FIGS. 3 and 4, the fuselage 30 comprises a structure 32, to which a skin 34 is connected, the skin 34 comprising a plurality of juxtaposed panels, 36, 36' (only visible in FIG. 3) fixed on the structure 32 by any suitable fixings, such as rivets 38.

The skin 34 forms a barrier between the exterior E and the interior I of the fuselage 30 and comprises an outer surface 39 oriented toward the exterior E and an inner surface 40 oriented toward the interior I.

The skin 34, and in particular the panels 36, 36', are advantageously made of composite material. In a variant, the skin 34, and in particular the panels 36, 36', are metal, for example made of aluminum alloy.

The structure 30 and the skin 34 are not described in greater detail, because they can be identical to those of the prior art.

The fuselage 30, at the exterior E of the fuselage, comprises an external coating 42. In accordance with a feature of the invention, the external coating 42 comprises a thermal insulator that covers the fuselage at least in part. The term "thermal insulator" means an element having a conductivity less than or equal to 0.5 W/m·k.

The thermal insulator preferably covers approximately the entire fuselage.

The thermal insulator is preferably present in the form of at least one foam insulating layer 44, in particular with closed cells.

The insulating layer 44 advantageously has a thickness of approximately between 1 and 5 cm.

In accordance with another feature, the external coating 42 comprises a framework 46, in the form for example of a lattice, for reinforcing the coating. This framework 46 is preferably embedded in the insulating layer 44. The framework 46 thus ensures the mechanical support of the insulating layer 44.

This framework 46 is preferably made of metal and is advantageously connected to the structure of the aircraft. This embodiment is more particularly suitable when the skin 34 is made of composite material. The metal framework 46 thus forms a Faraday cage surrounding the fuselage. This solution makes it possible to avoid the positioning of shielding around harnesses and electrical components, which tends to reduce the on-board mass.

The external coating 42, which integrates a thermal insulator, is plated or placed against the skin 34 and comprises voids 48 intended to accommodate, during use, certain areas of roughness of the skin 34.

This solution makes it possible to be able to use crowned rivets 38 and to maintain differences in height 52 between two panels 36, 36', which tends to simplify:

the design of certain parts of the structure on which the panels 36, 36' of the skin 34 are fixed, the mounting of the panels 36, 36' of the skin 34 on the structure of the aircraft with no recourse to the use of wedges to correct the differences in height.

The voids 48 and the differences in height 52 form spaces between the outer surface 38 of the skin 34 and the external coating 42, which are advantageously filled with the aid of an expandable foam. This foam ensures a good adhesion of the coating 42 to the skin 34 and produces a tightness reducing the quantity of trapped water, which, by freezing and expanding, could cause a local delamination.

In accordance with another feature of the invention, the external coating 42 comprises an external layer 54 connected to the insulating layer(s), in contact with airflows flowing outside the fuselage, of which the external surface 56 is smooth or is structured so as to provide the fuselage with the aerodynamic characteristics thereof.

The dissociation of the insulating and aerodynamic functions makes it possible to optimize each of the functions.

In accordance with one embodiment, the external layer 54 is adhesively bonded to the insulating layer 44.

The external layer 54 is advantageously made of shape-memory material, enabling it to deform and to return to its initial form following shocks.

In accordance with one embodiment, the external layer 54 is made of plastics material of the ABS type.

The external layer 54 is preferably pigmented or pre-painted so as to reduce the painting time and quantity of paint.

In accordance with another feature of the invention, the external coating 42 covering the fuselage comprises a plurality of juxtaposed panels 58, 58' adhesively bonded to the fuselage and/or secured to the fuselage by mechanical fixings 60.

Although flexible, each panel 58, 58' of the external coating 42 is advantageously pre-formed under heat so as to match perfectly the forms of the outer surfaces of the skin 34.

In FIG. 4, the front-rear direction extending from the front point of the aircraft to the rear tail is shown at 64. In accordance with this front-rear direction 64, in FIG. 4 the panel 58 corresponds to a front panel and the panel 58' corresponds to a rear panel. In addition, each panel comprises a rear edge 62 and a front edge 62'.

Each edge 62, 62' comprises an inner part 66, 66' corresponding to the part of the external coating 42 in contact with the skin 34 and an outer part 68, 68' distanced from the skin 34.

The panels 58, 58' are advantageously in abutment so as to provide the fuselage with aerodynamic features, and the edges 62, 62' of two abutting panels 58, 58' advantageously have complementary shapes so as to obtain a covering from front to rear of panels 58, 58' so as to avoid delamination and promote the flow of airflows outside the fuselage.

The term "covering from front to rear" means that the outer part 68 of the rear edge 62 of a front panel 58 covers the front edge 62' of a rear panel 58'.

In accordance with one embodiment, the external layer 54, at the rear edge 62 of the panels, extends beyond the insulating layer 44, toward the rear of the aircraft. In addition, at the front edge 62' of the panels, the external layer 54 is set back with respect to the insulating layer 44'. When a front panel 58 is juxtaposed with a rear panel 58', the external layer 54 of the front panel 58 then covers the insulating layer 44' of the rear panel 58'.

In accordance with one embodiment, at the rear edge 62 of the panels, the insulating layer 44 comprises a rectilinear portion 70, which is perpendicular to the skin 34 and extends from the inner part 66 of the edge 62 to the framework 46, and a curve portion 72 with a concave radius of curvature extending from the framework 46 to the outer part 68 of the edge 62. In addition, at the front edge 62' of the panels, the insulating layer 44' comprises a rectilinear portion 70', which is perpendicular to the skin 34 and extends from the inner part 66' of the edge 62' to the framework 46', and a curve portion 72' with a convex radius of curvature complementary to the concave radius of curvature of the curve portion 72 extending from the framework 46' to the outer part 68'. When a front panel 58 is juxtaposed with a rear panel 58', the curve portion 72 of the front panel 58 then covers the curve portion 72' of the rear panel 58'.

In order to ensure the continuity of the external surfaces 56, 56', any space between the adjacent external layers 54, 54' is filled by a joint 78 in the form of a mastic, for example.

The mechanical fixings 60 are advantageously provided in the vicinity of the rear edge 62 of the panels 58.

In order to ensure the electrical continuity between the frameworks 46, 46' of two adjacent panels 58, 58', each framework 46, 46' extends outside the panel in the form of a flexible strip 74, 74'. When the two adjacent panels 58, 58' are in abutment, the flexible strips 74, 74' are plated or placed one against the other.

In accordance with one embodiment, the mechanical fixings 60 are traversing and are thus in contact with the frameworks 46, 46'. The mechanical fixings are made of an electrically conductive material in order to ensure the electrical continuity between the metal frameworks 46, 46' and the structure 32 of the aircraft.

In accordance with another embodiment, each mechanical fixing 60 comprises a rod 80, which passes through the framework 46, as well as at least one spacer 82 made of an electrically conductive material, which extends around the rod 80 between the framework 46 and the fuselage 30. The spacer 82 preferably comprises a flange 84 in contact with the framework 46, and the mechanical fixing 60 preferably comprises a washer 86, such that the framework 46 is pinched between the flange 84 of the spacer 82 and the washer 86.

Each mechanical fixing 60 comprises a head 88, making it possible to hold the external coating 42 in a manner plated or placed against the skin 34 of the fuselage.

The external layer 54 advantageously comprises, for each mechanical fixing 60, a through-hole 90, of which the diameter is less than the diameter of the head 88, such that the external layer 54 is held against the insulating layer 44 by the mechanical fixings 60.

The heads 88 are embedded in the external coating 42.

In accordance with a first embodiment, for each head 88, the external coating 42 comprises a hollow seat making it possible to accommodate the head 88 such that the head does not protrude with respect to the external coating 42.

In accordance with a second embodiment, when the mechanical fixings 60 are placed in position, the insulating layer 44 is compressed and deformed until the heads 88 no longer protrude with respect to the external surface of the external coating 42.

If necessary, the external coating 42 comprises an addition 92 of mastic or a similar material in order to correct any differences in height at the heads 88 of the mechanical fixings 60.

The provision of an external coating 42 that integrates a thermal insulator provides the following advantages:

it makes it possible, in the interior of the fuselage, to replace the fragile insulation blankets with a film for draining any condensates, the film being more resistant and being able to adapt more easily to the different configurations of aircraft;

by keeping the skin 34 and the structure 32 of the fuselage 30 at a temperature greater than 0° C. during phases of flight, this makes it possible to prevent the humidity of the air from the interior of the fuselage from freezing upon contact with the skin 34 and the structure 32 of the fuselage 30, which tends to reduce the quantity of condensed water and the dryness of the air in the interior of the fuselage;

by removing the thermal bridges, this makes it possible to improve the thermal performances and to reduce the thicknesses of the insulating layers and the thermal gradients in the structure;

this makes it possible to use, for the thermal insulator, materials prohibited in the interior of the fuselage in accordance with the material requirements of FST standards;

this makes it possible to protect the skin 34 of the fuselage against shocks and corrosion;

this makes it possible to erase the imperfections of the fuselage by covering the imperfections;

this makes it possible to reduce potentially the perception in the interior of the fuselage of noise coming from engines.

The presence of a pre-formed external layer 54 makes it possible to improve the aerodynamic characteristics of the aircraft.

By increasing the thickness of the insulating layer 44, it is possible to modify, under development, if necessary, the external layer 54 so as to improve the aerodynamic performances of the aircraft, whereas the skin and the structure of the fuselage remain fixed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft fuselage comprising:
    a structure,
    a skin connected to said structure and forming a barrier between an interior and an exterior of the fuselage,
    an external coating placed against said skin,
    said external coating comprising a thermal insulator that covers the fuselage at least in part and having at least one foam insulating layer,
    said external coating comprising a plurality of juxtaposed panels adhesively bonded to the fuselage and/or secured to the fuselage by mechanical fixings wherein at an edge of said panels the insulating layer comprises a rectilinear portion arranged perpendicularly to the skin and extending from said skin to a framework, further a curved portion having a convex radius of curvature extends from said framework to an eternal layer.

2. The aircraft fuselage according to claim 1, wherein the external coating comprises an external layer connected to the at least one foam insulating layer, in contact with airflows flowing outside the fuselage, said external layer comprising a smooth or structured external surface.

3. The aircraft fuselage according to claim 2, wherein the external layer is made of a shape-memory material.

4. The aircraft fuselage according to claim 1, wherein the external coating comprises voids intended to accommodate, during use, any areas of roughness of the skin of the fuselage.

5. The aircraft fuselage according to claim 1, wherein the external coating comprises a framework for reinforcing said coating.

6. The aircraft fuselage according to claim 1, wherein the panels are abutted so as to provide the fuselage with aerodynamic characteristics, and wherein two abutted panels have edges with complementary shapes so as to obtain a covering from front to rear of panels so as to avoid delamination and so as to promote the flow of airflows outside the fuselage.

7. The aircraft fuselage according to claim 6, wherein the external coating comprises mechanical fixings in order to secure the panels to the fuselage, said mechanical fixings being arranged in the vicinity of a rear edge of the panels.

8. The aircraft fuselage according to claim 1, wherein each panel comprises a metal framework which protrudes outside the panel in the form of a flexible strip in order to ensure an electrical continuity between two adjacent panels.

9. The aircraft fuselage according to claim 1, wherein each panel comprises a metal framework, and wherein the external coating comprises mechanical fixings in order to secure the panels to the fuselage, each mechanical fixing comprising a rod which passes through the framework, as well as at least one spacer made of an electrically conductive material which extends around the rod between the framework and the fuselage.

10. The aircraft fuselage according to claim 9, wherein the spacer comprises a flange in contact with the framework, and wherein the mechanical fixing comprises a washer, such that the framework is pinched between the flange of the spacer and the washer.

11. An aircraft having a fuselage comprising:
a structure,
a skin connected to said structure and forming a barrier between an interior and an exterior of the fuselage,
an external coating placed against said skin,
said external coating comprising a thermal insulator that covers the fuselage at least in part and having at least one foam insulating layer,
said external coating comprising a plurality of juxtaposed panels adhesively bonded to the fuselage and/or secured to the fuselage by mechanical fixings wherein at an edge of said panels the insulating layer comprises a rectilinear portion arranged perpendicularly to the skin and extending from said skin to a framework, further a curved portion having a convex radius of curvature extends from said framework to an eternal layer.

\* \* \* \* \*